(12) United States Patent
Jianu et al.

(10) Patent No.: US 8,261,258 B1
(45) Date of Patent: Sep. 4, 2012

(54) COMMON INSTALLER CLIENT

(75) Inventors: Sorin Jianu, Seattle, WA (US); Sundar Pichai, Sunnyvale, CA (US); Jocelyn Lin, Menlo Park, CA (US); Ann Mei Chang, Mountain View, CA (US); Othman Laraki, Palo Alto, CA (US); Joerg Heilig, Los Altos, CA (US); John Fu, Sunnyvale, CA (US); Shankar Ganesh, Bellevue, WA (US); Jian Li, Bellevue, WA (US); Jesse Savage, Foster City, CA (US)

(73) Assignee: Google Inc., Mountain View, CA (US)

( * ) Notice: Subject to any disclaimer, the term of this patent is extended or adjusted under 35 U.S.C. 154(b) by 1059 days.

(21) Appl. No.: 11/262,056

(22) Filed: Oct. 28, 2005

(51) Int. Cl.
*G06F 9/445* (2006.01)
*G06F 9/44* (2006.01)

(52) U.S. Cl. ......... 717/174; 717/169; 717/177; 717/178

(58) Field of Classification Search .................. None
See application file for complete search history.

(56) References Cited

U.S. PATENT DOCUMENTS

| | | | |
|---|---|---|---|
| 5,835,777 A | 11/1998 | Staelin | |
| 5,845,077 A | 12/1998 | Fawcett | |
| 5,999,740 A | 12/1999 | Rowley | |
| 6,049,671 A | 4/2000 | Slivka et al. | |
| 6,073,214 A | 6/2000 | Fawcett | |
| 6,256,668 B1 | 7/2001 | Slivka et al. | |
| 6,301,707 B1 | 10/2001 | Carroll et al. | |
| 6,327,617 B1 | 12/2001 | Fawcett | |
| 6,347,398 B1 | 2/2002 | Parthasarathy et al. | |
| 6,353,452 B1 | 3/2002 | Hamada et al. | |
| 6,353,926 B1 | 3/2002 | Parthesarathy et al. | |
| 6,493,871 B1 | 12/2002 | McGuire et al. | |
| 6,604,238 B1 | 8/2003 | Lim et al. | |
| 6,725,452 B1 | 4/2004 | Te'eni et al. | |
| 6,920,110 B2 | 7/2005 | Roberts et al. | |
| 6,986,135 B2 | 1/2006 | Leathers et al. | |
| 7,020,875 B2 | 3/2006 | Zweifel et al. | |
| 7,140,013 B2 | 11/2006 | Te'eni et al. | |
| 7,185,336 B2 | 2/2007 | Vaughan | |
| 7,228,541 B2 | 6/2007 | Gupton et al. | |
| 7,310,801 B2 * | 12/2007 | Burkhardt et al. | 717/169 |
| 7,454,748 B2 * | 11/2008 | Ari-Pekka et al. | 717/174 |
| 7,478,381 B2 | 1/2009 | Roberts et al. | |
| 7,478,385 B2 * | 1/2009 | Sierer et al. | 717/174 |
| 7,584,470 B2 * | 9/2009 | Barker et al. | 717/177 |
| 7,610,583 B2 | 10/2009 | Milius | |
| 7,624,393 B2 | 11/2009 | Egan et al. | |

(Continued)

OTHER PUBLICATIONS

Yamasaki et al., Model-based resource selection for efficient virtual cluster deployment, Nov. 2007, 7 pages, <http://delivery.acm.org/10.1145/1410000/1408660/a6-yamasaki.pdf>.*

(Continued)

*Primary Examiner* — Thuy Dao
(74) *Attorney, Agent, or Firm* — Fish & Richardson P.C.

(57) ABSTRACT

Systems and techniques to provide for software installation. In general, in one implementation, the technique includes receiving a manifest, the manifest including a reference to one or more applications to be installed, obtaining an installer associated with an application, and using the associated installer to install the application on a target system, the application and the associated installer not being provided in the manifest.

18 Claims, 7 Drawing Sheets

U.S. PATENT DOCUMENTS

| | | | |
|---|---|---|---|
| 7,761,870 B2 | 7/2010 | Westendorf et al. | |
| 7,765,538 B2 | 7/2010 | Zweifel et al. | |
| 7,793,284 B2 * | 9/2010 | Mason et al. | 717/174 |
| 7,904,900 B2 * | 3/2011 | Forsyth | 717/178 |
| 7,945,906 B2 | 5/2011 | Bourke-Dunphy et al. | |
| 8,037,471 B2 * | 10/2011 | Keller et al. | 717/174 |
| 2002/0116340 A1 | 8/2002 | Hellberg et al. | |
| 2003/0046681 A1 | 3/2003 | Barturen et al. | |
| 2003/0061206 A1 | 3/2003 | Qian | |
| 2003/0084138 A1 * | 5/2003 | Tavis et al. | 709/223 |
| 2003/0126311 A1 * | 7/2003 | Kushnirskiy et al. | 709/328 |
| 2003/0135851 A1 | 7/2003 | Dickey et al. | |
| 2003/0192040 A1 | 10/2003 | Vaughan | |
| 2003/0212762 A1 * | 11/2003 | Barnes et al. | 709/219 |
| 2003/0236873 A1 | 12/2003 | Chantrain et al. | |
| 2004/0015953 A1 * | 1/2004 | Vincent | 717/173 |
| 2004/0060035 A1 | 3/2004 | Ustaris | |
| 2004/0143830 A1 | 7/2004 | Gupton et al. | |
| 2004/0255291 A1 * | 12/2004 | Sierer et al. | 717/174 |
| 2005/0132357 A1 * | 6/2005 | Shell et al. | 717/174 |
| 2005/0289538 A1 | 12/2005 | Black-Ziegelbein et al. | |
| 2006/0015866 A1 | 1/2006 | Ang et al. | |
| 2006/0031831 A1 * | 2/2006 | Templin et al. | 717/175 |
| 2006/0059481 A1 * | 3/2006 | Smith et al. | 717/173 |
| 2006/0075001 A1 | 4/2006 | Canning et al. | |

OTHER PUBLICATIONS

Liu et al., A formal framework for component deployment, Oct. 2006, 19 pages, <http://delivery.acm.org/10.1145/1170000/1167502/p325-liu.pdf>.*

* cited by examiner

| Time Period | Selected Apps | Target System (Before) | Target System Action | Target System (After) |
|---|---|---|---|---|
| (1) | | | | |
| (2) | $A_1$ | | $I_1 \rightarrow A_1$ | $A_1$ |
| (3) | $A_1, A_2, A_3$ | $A_1$ | $I_2 \rightarrow A_2$ $I_3 \rightarrow A_3$ | $A_1, A_2, A_3$ |
| (4) | $A_1, A_3$ | $A_1, A_2, A_3$ | $I_2 \leftarrow A_2$ | $A_1, A_3$ |
| (5) | $A_{1_2}$ | $A_{1_1}, A_3$ | $A_{1_1} \rightarrow A_{1_2}$ | $A_{1_2}, A_3$ |

COMMON INSTALLER CLIENT

CROSS REFERENCE TO RELATED CASES

This application is related to the following co-pending patent application, which is hereby incorporated by reference in its entirety:

U.S. patent application Ser. No. 11/261,953, entitled COMMON INSTALLER SERVER, filed Oct. 28, 2005.

TECHNICAL FIELD

This specification relates to a client/server model for installing software applications.

BACKGROUND

Downloading software applications over the Internet is a popular way to obtain software. Many software publishers and third parties have websites that allow users to download applications. However, different websites present different user interfaces making for varying user experiences. Furthermore, applications from different software publishers can utilize different installation programs with their own user interfaces and click-wrap end-user license agreements.

SUMMARY

This disclosure generally describes systems, methods and computer programs for implementing a client/server model for installing software applications.

In one aspect, a manifest is received, the manifest including a reference to one or more applications to be installed and a reference to one or more installers, each of the one or more applications being associated with a unique one of the one or more installers. And for each application referred to: obtaining the installer associated with the application; and using the associated installer to install the application on a target system, the application and the associated installer not being provided in the manifest.

Implementations may include one or more of the following features. The manifest is signed. The ability to detect if the manifest is genuine. The manifest is an XML document. Notifying a user of the availability of an application, or an update to an application, that is not one of the one or more applications. Obtaining one or more files that include the associated installer.

In another aspect, detecting that a reference to a first application has been added to a set of references to selected applications, the set being on a first system, each application referred to by the set to be mirrored on a target system and is associated with an installation framework and a server from which the application can be obtained. Installing the first application on the target system using the associated installation framework.

Implementations may include one or more of the following features. Detecting that a reference to a second application was removed from the set; and removing the second application from the target system using the associated installation framework. At least two of the associated installation frameworks are different. At least two of the associated servers are different. Notifying a user of at least one of: availability of a second application that is referred to by the set, or availability of an upgrade to an application referred to by one of the set. Obtaining the associated installation framework from the associated server.

Particular implementations can realize one or more of the following advantages. A common user interface and procedure is provided to install applications from different publishers. A user interface can present a user or a target system with a list of applications that is customized for the user. A software installation process can be automatic and can run unattended. A user can be notified of new software from different publishers as it is made available for downloading. A target system can background downloading of new applications ahead of time and notify the user that new software is available to install. This makes the process of installing new applications easier since the user does not have to wait for downloading to complete.

A common installer runtime (CIR) makes the process of downloading and installing software reliable by resuming downloads and installs after network disconnects or computer crashes. Another advantage is the ability to run newly installed and previously installed applications while continuing to download and install additional applications and the ability to detect an application that is already installed on a target system and only download and install the application if the server has a newer version of the application available. The CIR can automatically download and install updates or new software without requiring user intervention.

The details of one or more embodiments are set forth in the accompanying drawings and the description below. Other features, aspects, and advantages will be apparent from the description, drawings, and claims.

DESCRIPTION OF DRAWINGS

Like reference symbols in the various drawings indicate like elements.

DETAILED DESCRIPTION

Figures 1, 2:
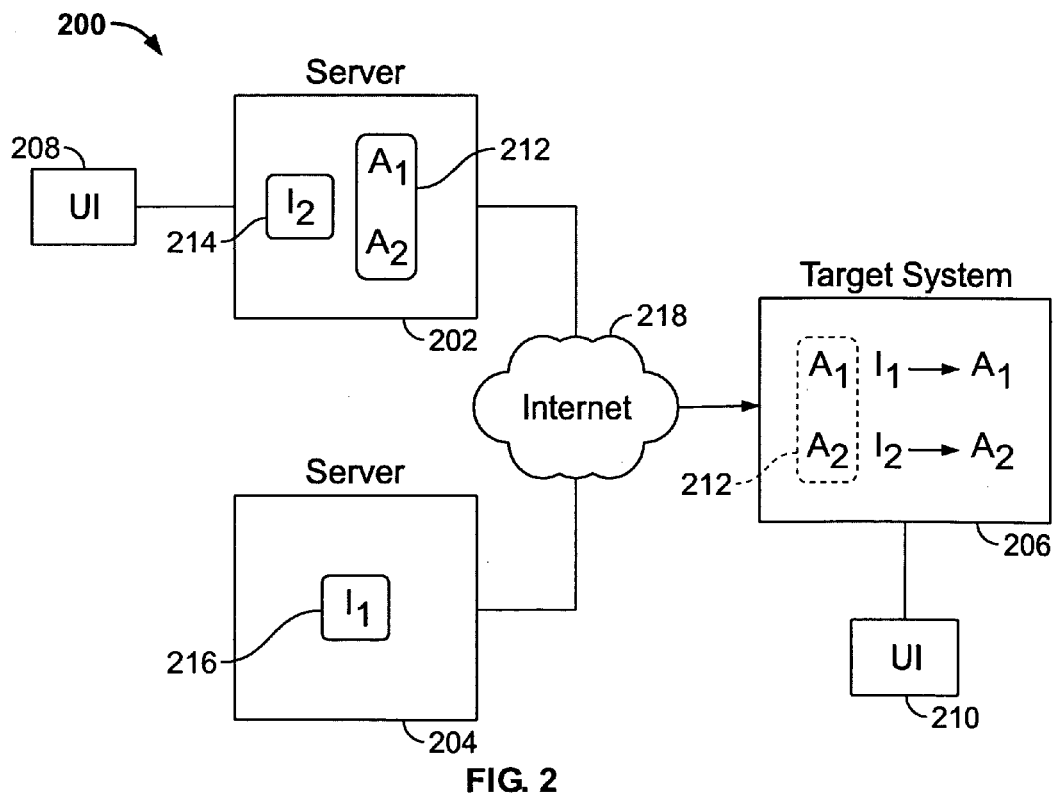
FIG. 1 is a table illustrating additions and deletions to applications selected for installation on a target system.
FIG. 2 illustrates a system for software installation having a server side and a client side.

FIG. 1 is a table illustrating additions and deletions to applications selected for installation on a target system.

Table 100 illustrates how a target system responds to changes made to a set of selected applications by a user over time. An application includes functionality or information that can be executed, interpreted or used by another application on a target system. By way of illustration and without limitation, an application can include one or more of the following: a word processor, a dynamically or statically linked software library, a distributed object, a plug in for another application such as a web browser or mail program, programming language source code, an XML document, an image, audio/visual information, and data. An application can be compressed, encrypted, and/or digitally signed. Moreover, an application can be a different version or edition of a previously installed application.

Column 104 shows additions and deletions made to the set of selected applications on a server by a user on a target system for each time period in column 102. Column 106 shows the applications installed on the target system before changes to the set of selected applications are incorporated or mirrored on the target system. A target system can include, without limitation, a workstation, a personal computer, a wireless mobile computer (e.g., a personal digital assistant), and a device incorporating a cellular telephone, a digital media player, or an electronic game system. In one implementation, the server and the target system are the same system. Column 108 shows action(s) the target system can take to mirror changes to the selected applications. And column 110 shows the applications installed on the target system after the changes to the set of selected applications are incorporated.

In period (1), the set of selected applications is empty and no applications are installed on the target system. An application $A_1$ in an inventory of available applications is added by a user to the set of selected applications in period (2). This prompts the target system to obtain an installer $I_1$ for $A_1$ and use $I_1$ to install $A_1$ on the target system (denoted as $I_1 \rightarrow A_1$). The resulting state of the target system now shows the presence of application $A_1$. In period (3), two applications ($A_2$, $A_3$) from the inventory of available applications are added by a user to the set of selected applications. The target system obtains and invokes the installers for $A_2$ ($I_2 \rightarrow A_2$) and $A_3$ ($I_3 \rightarrow A_3$). As a result, the target system has $A_1$, $A_2$ and $A_3$ installed.

In period (4), application $A_2$ is removed by a user from the set of selected applications. In one embodiment, removed applications remain on the target system until the user chooses to uninstall them. In another embodiment, this prompts the target system to invoke an uninstaller for $A_2$ ($I_2 \leftarrow A_2$). In this case, the resulting applications on the target system would be $A_1$ and $A_3$. In yet a further embodiment, an installer for a new version of an application automatically uninstalls the prior version from the target system.

In period (5), version two of application $A_1$ ($A_{1_2}$) is selected. For example, this might be an upgrade or a downgrade to application $A_1$ on the target system. The applications available on the target system before selection of $A_{1_2}$ are version one of $A_1$ ($A_{1_1}$) and $A_3$. The target system uninstalls, demotes or replaces $A_{1_1}$ with $A_{1_2}$ by installing $A_{1_2}$ (indicated by $A_{1_1} \rightarrow A_{1_2}$). In one embodiment, a given version of an application is not downloaded and/or replaced until the user provides confirmation. The version of an application can indicate different product lines and different kinds of versions (e.g., free versions, premium versions, enterprise versions, or corporate versions). Rules can be utilized to make decisions based on version information, such as whether a given application version can be downloaded, installed, uninstalled or upgraded. For example, if a user has already installed a premium version of an application, it would not make sense to replace it with a to lesser version.

FIG. 2 illustrates a system for software installation having a server side and a client side. The system 200 includes a target system 206 and one or more server systems (202, 204) which communicate through one or more public, private, wired and/or wireless communication networks 218 (e.g., the Internet). The server 202 can provide a user interface 208 through which a user can choose one or more applications from the inventory of available applications to be added to or removed from the set of selected applications 212 (see FIG. 9). Although examples are given in terms of a single user and a single target system 206, the server 202 can provide its services to disparate users and target systems that interact with the server 202 independently of one another. In a further implementation, the server 202 and the target system 206 are the same.

Figure 11:
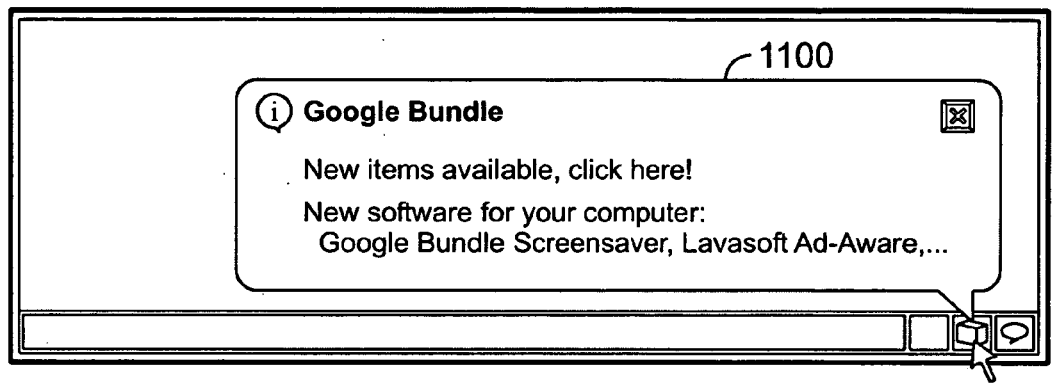
FIG. 11 is an example new software notification.
Figure 12:
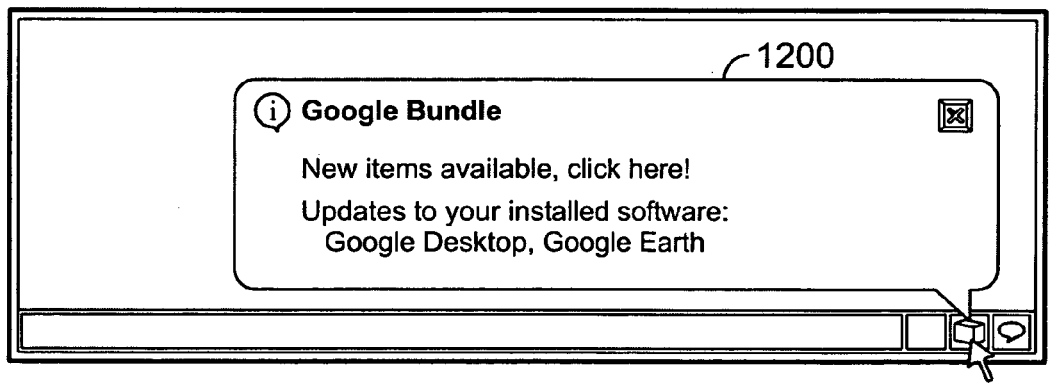
FIG. 12 is an example update(s) notification.

Adding and removing applications to or from the set of selected applications 212 by a user can cause the applications to be installed or, in one embodiment, uninstalled, from target system 206. A user's set of selected applications can be saved in one embodiment so that other target systems can be configured using the saved selections. Moreover, adding applications (or new versions of applications) to the inventory of available applications can cause the user of the target system to be notified that new software is available to potentially add to the set of selected applications 212. See FIGS. 11-12.

In one embodiment, the user interface 208 can present a personalized inventory of available applications from which the user can choose to install on the target system 206. For example, applications can be chosen for the inventory that would complement or upgrade the applications already installed on the target system. The inventory can include applications not already installed on the target system 206. Alternatively, the inventory of applications can be personalized based on the country or region the target system's Internet Protocol (IP) address maps to. For example, an IP address can be mapped to a physical location using a geolocation service such as hostip.info.

In one embodiment, the server 202 can maintain a list of applications that have been installed on a given target system. The target system can be identified based on a user login, an IP address, an HTTP cookie or through other suitable means. User selected applications can be stored in the list and used to customize the inventory of available applications presented to the user. In another embodiment, the list of installed applications can be provided to the server by the target system 206 using, for example, a URL, an HTTP cookie, or other suitable means.

In another embodiment, the user interface 208 can present a list of applications from which the user can choose to add to the set of selected applications 212 based on a characteristic of the user and/or a characteristic of a group of users to which the user belongs. By way of illustration, applications can be chosen by a process for the list of applications based on what other users similar to the user selected and/or what family members, friends or associates of the user purchased or recommend. By way of a further illustration, applications can be chosen that would be of interest to the user given the user's profile. A user profile can contain information describing a user's occupation, interests, income, location, tastes in food, music, electronics and other consumer items, and other suitable traits. In further embodiments, the inventory of applications can be personalized based on any suitable factors, including a combination of the factors discussed above.

In another embodiment, related applications can be grouped logically as bundles from which the user can select individual applications. For example, a "new user" bundle could contain applications a new user might need on their system and an "advanced user" bundle could contain applications that require more training and user sophistication.

Applications in the inventory of available applications can be provided by different software publishers (e.g., Google, Mozilla). The applications that are added to the set of selected applications 212 can be installed by different installation frameworks (e.g., InstallShield, Microsoft Installer, NullSoft). In one embodiment, an application installer (or "installer") contains both the application and its installation framework. In another embodiment, the installer is embodied in one or more files where the files can be located on the same or different servers. Alternatively, the installer contains the installation framework but has the capability of locating and downloading a representation of the application from one or more locations.

An installation framework can establish an application on the target system by installing the application in stages. Early stages can notify processes on the target system of the installation, test for system compatibility, and determine whether or not the target system has sufficient resources. Later stages can allocate any resources on the target system that the application may need to properly function (e.g., space on a file system, logical devices, registry values, ports, and any other suitable resource) and extract application components from the installer. Some installation frameworks allow for rolling back installation stages upon user cancellation or failure of the installation process. Installation frameworks can also create an uninstaller based on the installation. When invoked, the uninstaller will safely remove an application from the target system and free any resources the installer had allocated for it.

A manifest 212 describes the selected applications (i.e., $A_1$ and $A_2$). Each application referred to in the manifest 212 has an associated installer (214, 216) which in one embodiment is located on a server (202, 204) that is accessible to the target system 206. In another embodiment, an installer can be located on the target system. For example, if the installer was distributed on a compact disc or other media which is accessible to the target system. As a further example, an installer can be included in the install stub (see below). An installer is responsible for installing its associated application on the target system 206. In this illustration, the installer $I_1$ 216 for application $A_1$ is located on server 204. The installer $I_2$ 214 for application $A_2$ is located on server 202. The manifest 212 also includes the location of each application's associated installer. In one embodiment and referring to Table 1 below, the manifest 212 can include the following information for each selected application:

TABLE 1

| MANIFEST INFORMATION | DESCRIPTION |
| --- | --- |
| Application name | A localized display name. |
| Version | The application version. |
| Description | A localized description. |
| Logo | Application icon (e.g., specified as a URL.) |
| More Info URL | A help URL for the application. |
| Command Line Parameters | Command line parameters to pass to the associated installer. |
| Install Path | A relative application installation path. |
| Product Code | The product code as it appears in an Add/Remove programs user interface. |
| Code Base | The location of the installer (e.g., a URL). The installer can be local if it was already downloaded to the target system. |
| System Requirements | Platform/web browser requirements to install and run the application. |
| Applications to Close | Applications to close before the installer is invoked. |
| Hash | A SHA-1 has of the installer. |
| Size | Total size of the installer in bytes. |
| Install Policy | Policy to control the installation of the software. |
| Application To Run | Application to run after the setup is complete. |

In one embodiment, the manifest 212 is represented as an Extensible Markup Language (XML) document. The manifest 212 can be digitally signed to protect against tampering that would alter the information in the manifest and potentially cause malicious code to be installed on the target system 206. Alternatively, the server 202 can provide other suitable information to the target system 206 such that the target system 206 can determine of the manifest is genuine.

Once the user has selected the applications for installation on the target system, the user is presented with a single end-user license agreement (EULA) encompassing all of the selected applications. The user can interactively accept or reject the EULA. If the user accepts the EULA, a new manifest 212 is generated representing the selected applications. The manifest 212 is then provided to the target system 206. The target system 206 obtains the installers from the locations specified in the manifest (if they have not already been obtained) and uses the installers to install each application referred to in the manifest (i.e., $A_1$ and $A_2$). A target system 206 user interface 210 can be used to show the status of the installations as they progress (see FIG. 10).

Figure 3:
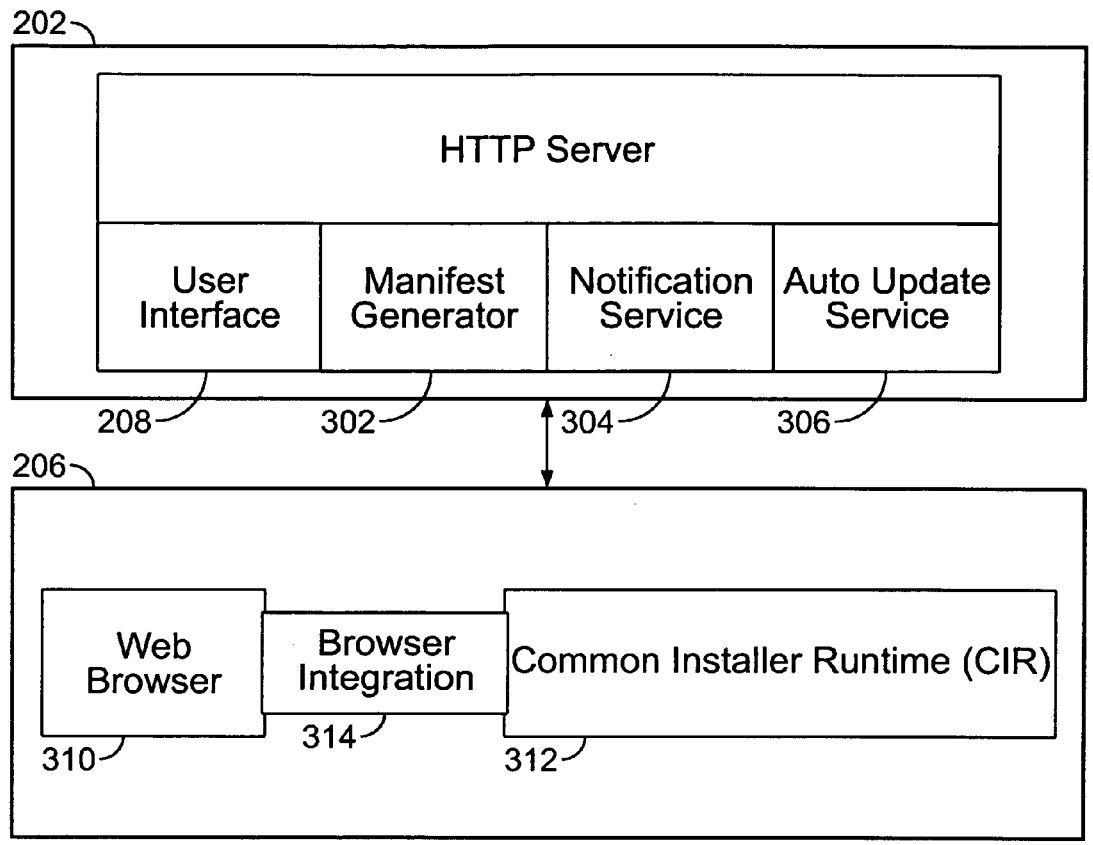
FIG. 3 illustrates a server system and a target system.

FIG. 3 illustrates a server system and a target system. The operations described for the server 202 or the target system 206 can be implemented with more or fewer components than are illustrated. The server 202 or the target system 206 components can be distributed across two or more computing devices connected by a network, shared memory or other suitable means of sharing information. In one embodiment, the server 202 and the target system 206 components all reside on the target system.

As discussed earlier, the server system 202 user interface 208 allows a user to select applications for installation on a target system. The user interface 208 implements a protocol for interaction between the server 202 and a user of the target system 206. In one embodiment, the user interface 208 is rendered with Dynamic Hypertext Markup Language (DHTML) and JavaScript. The user interface 208 could be personalized based on the user's target system configuration and other factors by means of an ActiveX control, Netscape Plug-in, or another suitable method. A web browser 310 or other suitable application on the target system 206 can present the user interface 208 to the user so that the user can select the applications to be installed on the target system.

A manifest generator 302 on the server 202 generates a manifest based on the user's selections. The manifest is provided to a common installer runtime (CIR) 312 on the target system 206. The CIR 312 is a program that continually runs on the target system. In one embodiment, the manifest generator 302 digitally signs the manifest before it is provided to the CIR 312. In another embodiment, all possible manifests are precomputed (i.e., based on all possible combinations of the user's selections), signed and stored such that no computationally expensive signing is required before sending the manifest to the CIR 312.

A notification service 304 allows the CIR 312 to discover new applications (or newly available version of applications) available for installation on the target system 206. In one embodiment, the notification service 304 is a web service that accepts messages encoded as XML documents that the CIR 312 can send to discover new applications. In another embodiment, the notification service 304 pushes notification messages to the CIR 312 without requiring the CIR 312 to query the notification service 304. In one embodiment, the CIR 306 can obtain installers quietly in the background as the CIR 306 learns of new software from the server 202. This means that installation can begin immediately if a user selects to have these new programs installed (e.g., through user interface 208).

The target system 206 user interface 210 can present a notification (1100, 1200) to the user of new programs (or program version) that are available and present the server user interface 208 to the user (e.g., by the user selecting the notification 1100 or 1200) so that the user can select the applications for installation on a target system 206. See FIGS. 11-12. For example, the notification can be implemented using a Microsoft Windows system tray icon notification or other suitable indicator. In one embodiment, the target system 206 can invoke the server user interface 208 by customizing HTTP requests to the server. For example, user or target system information can be encoded in the URL, either directly, by using a browser helper object to rewrite the URLs, or by using HTTP cookies. In another embodiment, browser plugins, such as ActiveX, Netscape Plugin Application Programming Interface (NPAPI) plugins, or Cross Platform Component Object Model (XPCOM) plugins can be used to facilitate communication between the CIR 312 and the web browser.

An auto update service 306 allows the CIR 312 to update itself when a new version of the CIR 306 becomes available. The auto update service 306 can push notification messages to the CIR 312 to alert the CIR 312 that a new version is available. Alternatively, the CIR 312 can query the auto update service 306 to learn of updates. In one embodiment, the CIR 312 can download a new version of itself from the auto update service 306 using the download manager 406 or other suitable means.

A browser integration component 314 on the target system 206 provides a link between the web browser 310 and the CIR 312. In one embodiment, the server 202 sends the manifest (or CIR install stub, see below) to the target system using the web browser 310. For example, this can be accomplished with a Microsoft Windows Shell file extension and Multipurpose Internet Mail Extensions (MIME) type registration. If the CIR 312 is not installed on the target system 206 at the time when the server 202 needs to send the manifest to the target system 206, the server will send the CIR 312 and the manifest (or manifest handle) to the target system. A manifest handle is a value (e.g., a number or a string) that uniquely identifies a manifest on the server 202.

In one embodiment, the server 202 prepares a CIR install stub including the manifest (or manifest handle). An install stub is a small executable module (e.g., an EXE or DLL) that is provided to the target system 206. An install stub can be compressed and/or digitally signed. The install stub installs the CIR 312 on the target system 206 and then activates the CIR 312 so that the installation of applications on the target system 206 can commence. The install stub includes an embedded CIR module and a manifest file or a manifest handle that identifies a specific manifest on the server 202. The install stub is executed on the target system 206. It extracts the CIR module, installs the CIR 312 on the target system 206, and then invokes the CIR 312 passing the manifest or manifest handle as a command line argument. If a manifest handle is passed to the CIR 312, the CIR 312 can download the corresponding manifest from the server 202. In one embodiment, the install stub can include the installers referenced by the manifest. In this embodiment, the CIR does not need to download the installers.

Figure 4:
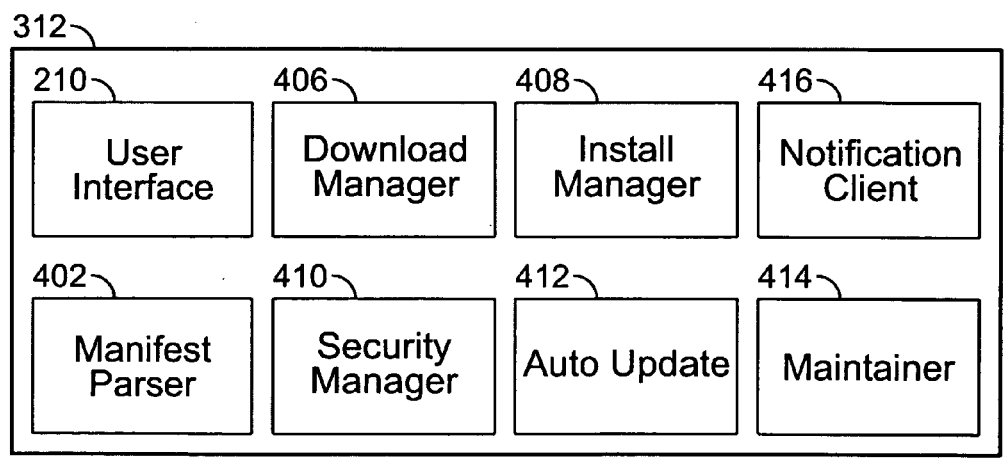
FIG. 4 illustrates one implementation of a CIR.

FIG. 4 illustrates one implementation of a CIR. The CIR 312 includes a manifest parser component 402 which creates an internal data structure associated with a manifest received from the server 202. In one embodiment, the manifest parser is an XML document object model parser. An install manager component 408 is responsible for managing the overall installation process of the applications. It does this by downloading the manifest and using a download manager component 406 to download the application installers referred to in the manifest (and not available locally). The download manager 406 is responsible for reliably downloading installers from servers over unreliable network connections. In various embodiments, the download manager 406 can provide serialized or concurrent downloads, pause and resume capabilities so that the download manager 406 can reliably download over slow or intermittent links and resume incomplete downloads without starting them over, or bandwidth throttle control, so downloading does not fully saturate the network interface or make the user interfaces unresponsive. For example, the download manager 406 can be implemented using WinInet or Background Intelligent Transfer Service (BITS), both available from Microsoft Corporation of Redmond, Wash.

The install manager 408 can also utilize a security manager component 410 to verify the integrity of the installers. In one embodiment, the security manager component 410 determines if an installer is genuine (i.e., has not been tampered with). For example, an installer can be digitally signed. A digital signature is information that is encrypted with a private key and included with the installer to ensure the integrity and authenticity of the installer. If the security manager component 410 determines that an installer is not authentic, the install manager 408 will not invoke the installer. In this way, the install manager 408 prevents malicious code from being executed by the target system 206.

If an installer is genuine, the install manager 408 invokes the installer so that the installer installs its associated applications in silent mode. Silent mode means that an installer is not permitted to present its own user interface. A persistent store can be used by the install manager 408 to store information describing the applications it has installed. In one embodiment, the install manager 408 installs applications in sets of size x. For example, if x is one, then as soon as the download manager 406 has downloaded the first installer the installation can begin. If x is five, then five installers will be downloaded before they are invoked to install their associated applications. If x is one, this gives the user access to installed programs sooner than having to wait for other installers to be downloaded first and can reduce any side-effects of running different installers at the same time.

In one embodiment, each installer can have 1 to N number of error codes it returns upon execution. The install manager 408 can capture these error codes after each installer executes and present different user interfaces based on the associated meaning of each code. For example, installers can return 0 for success or 1 for failure. But they can also return another number that indicates the program was installed successfully except for a particular condition (e.g., not being able to create a desktop icon, requiring that the target machine be rebooted, and requiring that a particular program be closed). In certain cases, the error code might dictate that the user be offered the option to run the visual or interactive installation framework that users would normally encounter were they to try and install a application without using the CIR 312. In another embodiment, each installer can optionally present a user interface.

A maintainer component 414 can download installers for new application versions in the background as long as there is disk space available. In one embodiment, the downloading happens without asking for the user's permission. The installer manager 408 implements logic to detect program versions so that it does not download programs that the user already has. In one embodiment, applications can advertise a version checking policy in the manifest. In another embodiment, applications can provide application programming interfaces that allow the CIR 312 to query their version.

A notification client 416 calls the server notification service 304 to discover new applications or updates to applications already installed (i.e., new versions). In one embodiment, the protocol can be based on simple XML messages that are communicated between the notification client 416 and the notification service 304. In another embodiment, the protocol can be based on the Rich Site Summary (RSS) protocol to deliver notifications as RSS news. In one embodiment, the header of each message includes a protocol version, a server build number, and a message identifier to easily correlate the requests and the responses for logging and debugging purposes. The responses can be optionally digitally signed for data integrity protection.

In one embodiment, the notification client 416 can generate user notifications (e.g., 1100 and 1200) based on the applications installed on the target system 206 or other criteria. See FIGS. 11-12. For example, the notification client 416 can recognize whether the user has installed the Google Toolbar but has chosen not to install a complimentary application, e.g., Google Desktop. The notification client 416 can let the user know about this condition and give the user the option of downloading related applications.

The auto update component 412 communicates periodically with the server auto update service 306. A set of messages can be exchanged between the auto update service 306 and the auto update component 412 by which the auto update component 412 discovers if there is an update available. If an update is available, the auto update component 412 can utilize the install manager 408 to download and install it. In one embodiment, the update is a package of code and data that upgrades the CIR 312.

Figure 5:
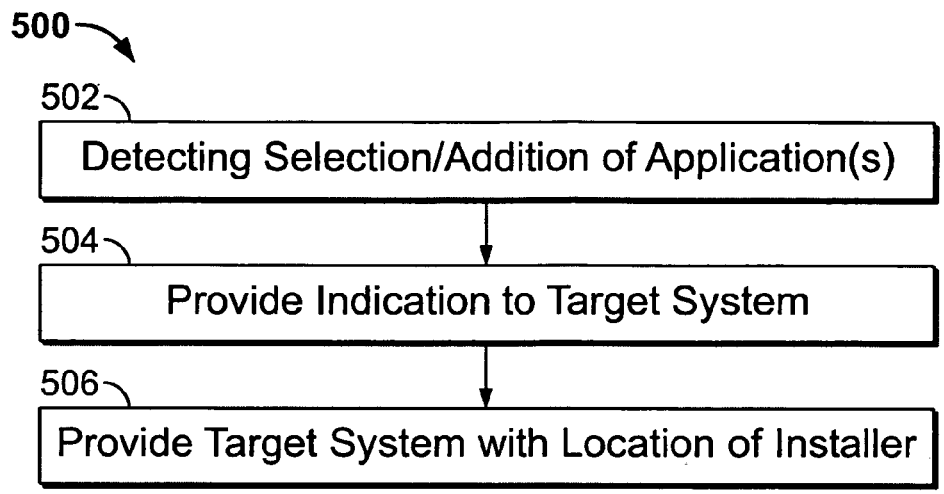
FIG. 5 is a flow chart illustrating a server notifying the target system.

FIG. 5 is a flow chart illustrating a server notifying the target system. The server 202 detects selection of application (s) through the user interface 208 (step 502). The server 202 provides notification of the change to the CIR 312 on the target system 206 through the notification service 304 (step 504). The server 202 provides the target system 206 with a manifest that includes the location of the installer(s) for the one or more selected applications (step 506).

Figure 6:
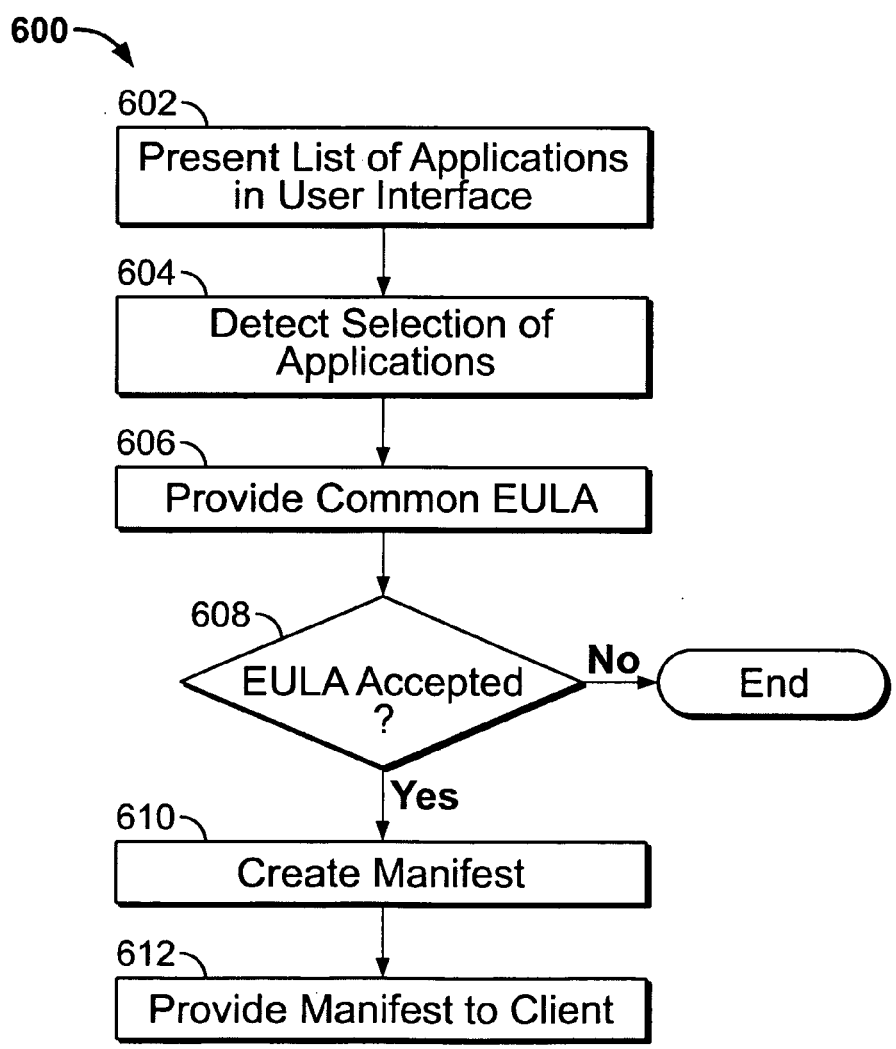
FIG. 6 is a flow chart illustrating a server providing a manifest to a target system.

FIG. 6 is a flow chart illustrating a server providing a manifest to a target system. The server 202 presents a potentially personalized list of applications in user interface 208 (step 602). The server 202 detects selection of one or more of the applications in the list (step 604). The server 202 presents a single, common EULA with the user interface 208 encompassing all of the selected applications (step 606). If the EULA not accepted by the user, the process ends. Otherwise, the manifest generator 302 creates a manifest (step 610). The manifest is provided to the client (step 612).

Figure 7:
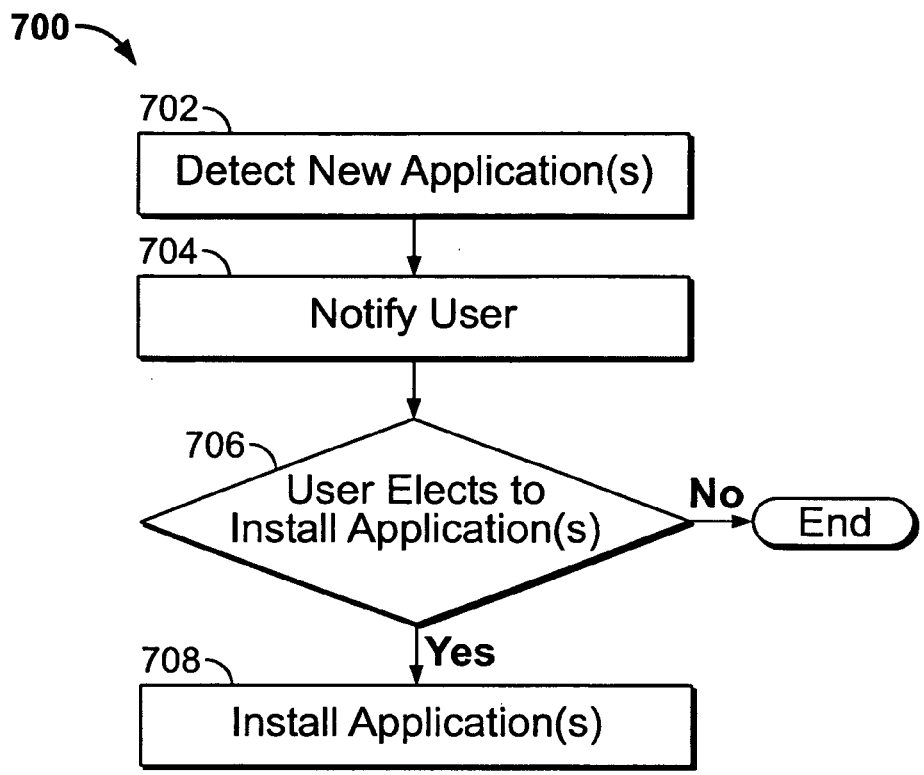
FIG. 7 is a flow chart illustrating user notification of new application(s).

FIG. 7 is a flow chart illustrating user notification of new application(s). New application(s) or updates to applications already installed that are available for installation on the target system 206 are detected by the maintainer component 414 (step 702). The target system 206 user is notified with the target system user interface 210 (step 704). The target system 206 determines whether or not the user has elected to install the applications (step 706). If not, the process ends. Otherwise, the install manager 408 installs the applications on the target system 206.

Figure 8:
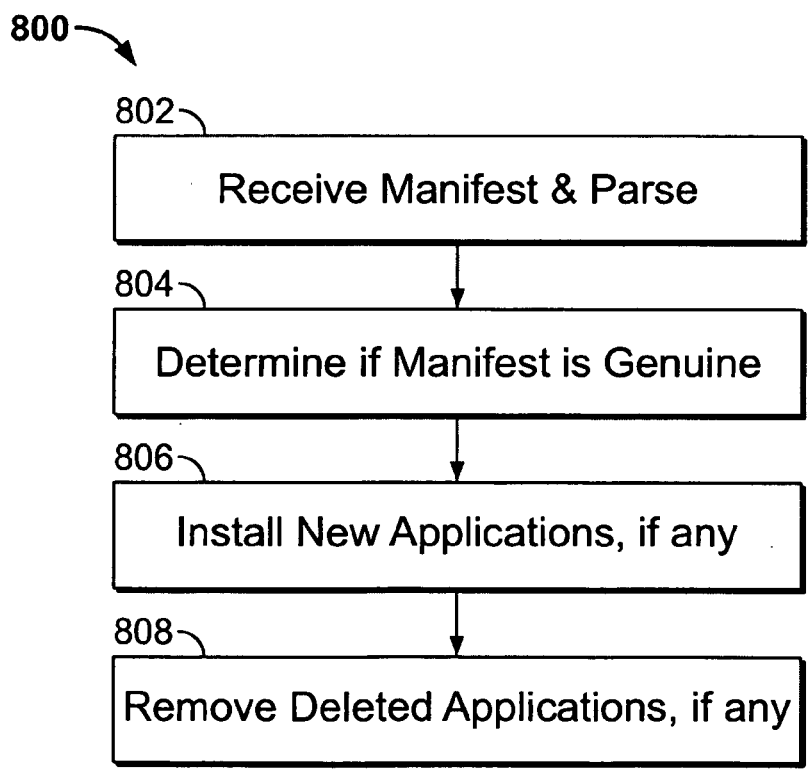
FIG. 8 is a flow chart illustrating manifest processing by the target system.

FIG. 8 is a flow chart illustrating manifest processing by the target system. The manifest parser 402 parses the manifest (step 802). The security manager 410 determines if the manifest is genuine (step 804). The download manager 406 downloads the applications referenced in the manifest if they are not already downloaded. The install manager 408 installs new applications, if they are not already installed on the target system 206 (step 806). This can entail determining if the same application with the same version is already installed on the target system 206. In one embodiment, the install manager 408 uninstalls any applications that were in the previous version of the manifest but are not in the current version of the manifest.

Figure 9:
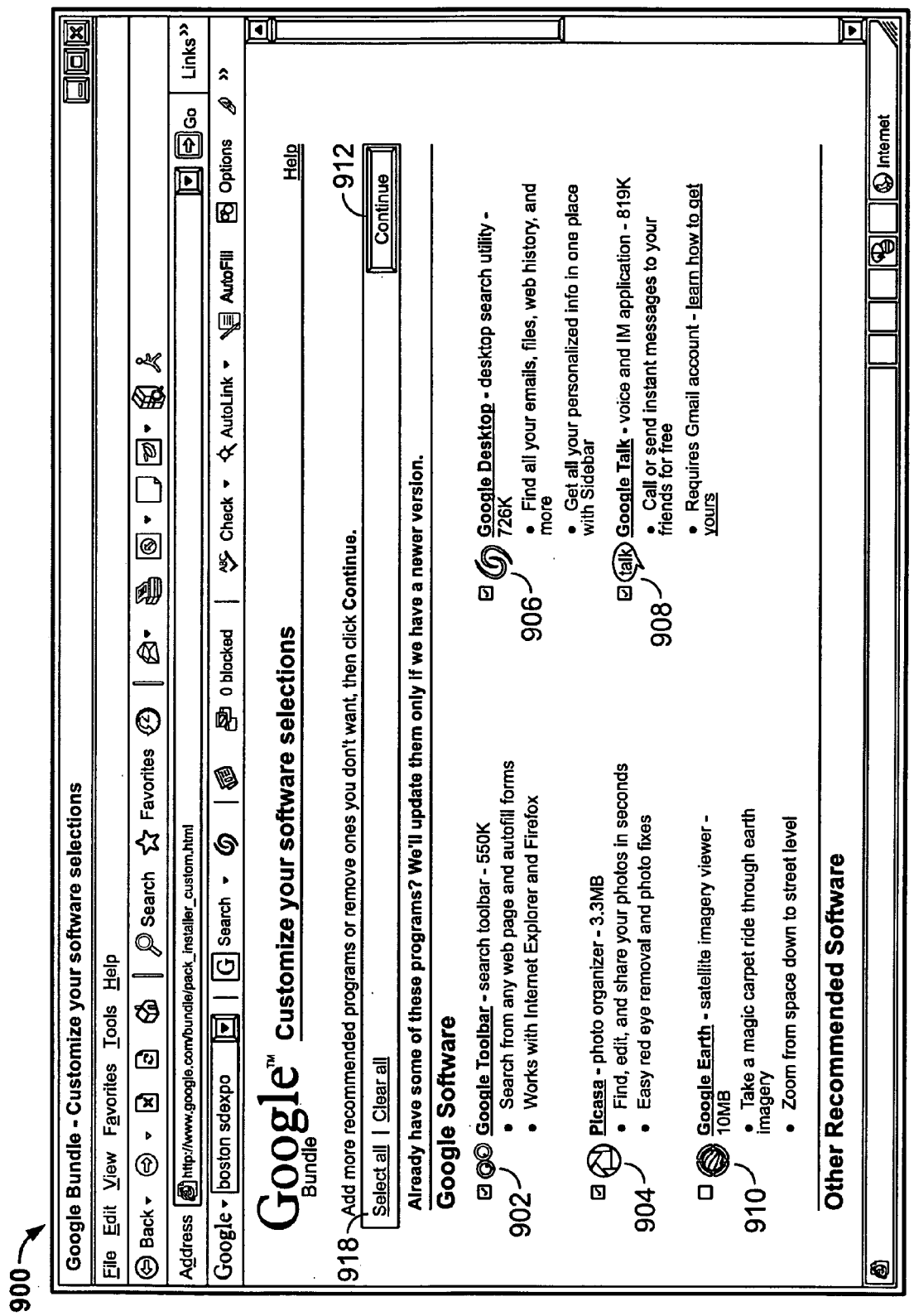
FIG. 9 is an example server system user interface.

FIG. 9 is an example server system user interface. User interface 900 can be presented to the user in web browser 310. The user interface 900 allows the user to select which applications (902, 904, 906, 908, 910) to install on a target system 206. The applications in this instance are part of a bundle identified by the string 914. In this example, applications 902, 904, 906 and 908 have been selected. If the user selects the "select all" link 918, all of the applications will be selected. If the user selects the "Continue" button 912, the user will be presented with a single EULA for the selected applications. If the user accepts the EULA, the applications will be installed on the target system.

Figure 10:
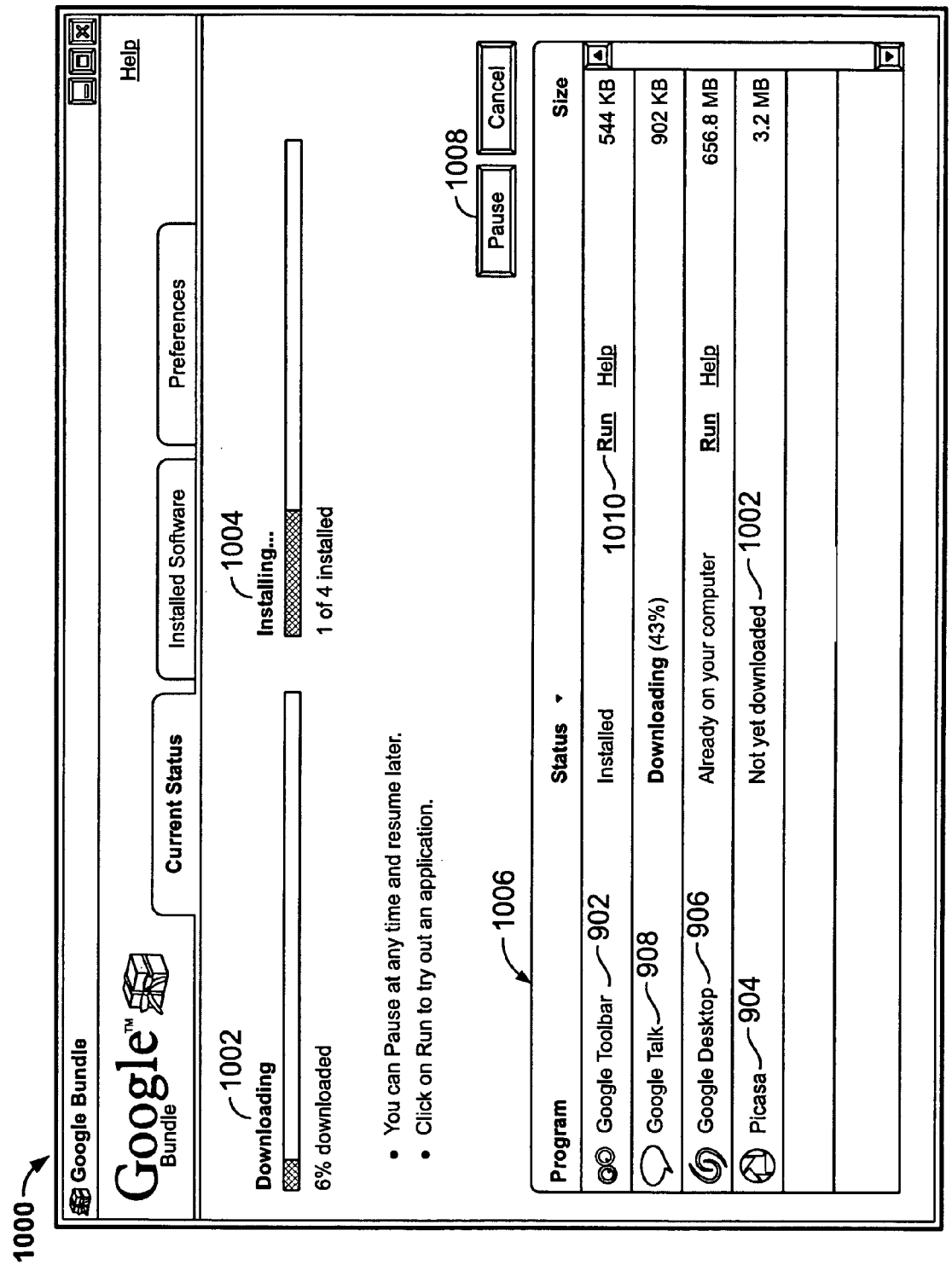
FIG. 10 is an example target system user interface.

FIG. 10 is an example target system user interface. User interface 1000 can be presented to the user in web browser 310. The user interface 1000 shows the status of applications being downloaded and installed on the target system 206. A download status bar 1002 shows the progress of downloading all required installers. A installer status bar 1004 shows the progress of installing all applications on the target system. All selected applications are listed in region 1006 along with their current status (e.g., installed or downloading). In this illustration, the "Google Toolbar" application 902 is installed and can be launched if the user selects the run link 1010. The "Google Talk" application 908 is still downloading and thus cannot yet be launched. The "Google Desktop" application 906 was previously installed on the target system and can be launched. The "Picasa" application 904 is awaiting download. In one embodiment, a user can select an application from region 1006 and then select the pause button 1008 to temporarily suspend the download of that application.

The embodiments and all of the functional operations described in this specification can be implemented in digital electronic circuitry, or in computer hardware, firmware, software, or in combinations of them. Apparatus of the embodiments can be implemented in a computer program product tangibly embodied in a machine-readable storage device for execution by a programmable processor; and method steps of the embodiments can be performed by a programmable processor executing a program of instructions to perform functions of the embodiments by operating on input data and generating output.

The embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the embodiments can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiment have been described. Nevertheless, it will be understood that various modifications may be made without departing from the spirit and scope of the disclosure. Accordingly, other embodiments are within the scope of the following claims.

What is claimed is:

1. A computer-implemented method, the method comprising:
   receiving an installer runtime and a first manifest or a first manifest handle identifying the first manifest on a target system, the first manifest referring to one or more first applications available to be installed and referring to one or more first installers, and identifying a first respective server from which each of the one or more first installers can be obtained, each of the one or more first applications being associated with a corresponding first installer of the one or more first installers;
   responsive to the receiving, installing the installer runtime on the target system; and
   executing the installer runtime on the target system to perform first operations comprising:
      for each of the one or more first applications referred to in the first manifest:
         obtaining the corresponding first installer associated with the first application from the first respective server identified for the corresponding first installer by the first manifest, and
         using the corresponding first installer obtained from the first respective server to install the first application on the target system, wherein the first application and the corresponding first installer are not in the first manifest or in the installer runtime;
   receiving a second manifest or a second manifest handle identifying the second manifest, the second manifest referring to one or more second applications available to be installed that is not already installed and referring to one or more second installers, and identifying a second respective server from which each of the one or more second installers can be obtained, each of the one or more second applications being associated with a corresponding second installer of the one or more second installers;
   responsive to the receiving executing the installer runtime on the target system to perform second operations comprising,
   for each of the one or more second applications referred to in the second manifest:
      obtaining the corresponding second installer associated with the second application from the second respective server identified for the corresponding second installer by the second manifest, and
      using the corresponding second installer obtained from the second respective server to install the second application on the target system, wherein the second application and the corresponding second installer are not in the second manifest or in the installer runtime.

2. The method of claim 1, where:
   the manifest is signed.

3. The method of claim 2, the operations further comprising:
   detecting that the manifest is genuine.

4. The method of claim 1 where:
   the manifest is an Extended Markup Language (XML) document.

5. The method of claim 1, the operations further comprising:
   notifying a user of the availability of an application, or an update to an application, that is not one of the one or more applications.

6. The method of claim 1 where obtaining an installer associated with an application includes:
   obtaining one or more files that include the associated installer.

7. A computer program product, stored in a computer-readable storage device, operable to cause data processing apparatus to perform operations comprising:
   receiving an installer runtime and a first manifest or a first manifest handle identifying the first manifest on a target system, the first manifest referring to one or more first applications available to be installed and referring to one or more first installers, and identifying a first respective server from which each of the one or more first installers can be obtained, each of the one or more first applications being associated with a corresponding first installer of the one or more first installers;
   responsive to the receiving, installing the installer runtime on the target system; and
   executing the installer runtime on the target system to perform first operations comprising:
      for each of the one or more first applications referred to in the first manifest:
         obtaining the corresponding first installer associated with the first application from the first respective server identified for the corresponding first installer by the first manifest, and
         using the corresponding first installer obtained from the first respective server to install the first application on the target system, wherein the first application and the corresponding first installer are not in the first manifest or in the installer runtime;
   receiving a second manifest or a second manifest handle identifying the second manifest, the second manifest referring to one or more second applications available to be installed that is not already installed and referring to one or more second installers, and identifying a second respective server from which each of the one or more second installers can be obtained, each of the one or more second applications being associated with a corresponding second installer of the one or more second installers;
   responsive to the receiving executing the installer runtime on the target system to perform second operations comprising,
   for each of the one or more second applications referred to in the second manifest:
      obtaining the corresponding second installer associated with the second application from the second respective server identified for the corresponding second installer by the second manifest, and
      using the corresponding second installer obtained from the second respective server to install the second application on the target system, wherein the second application and the corresponding second installer are not in the second manifest or in the installer runtime.

8. The program product of claim 7 wherein the manifest is signed.

9. The program product of claim 8 wherein the second operations further comprise detecting that the manifest is genuine.

10. The program product of claim 7 wherein the manifest is an Extended Markup Language (XML) document.

11. The program product of claim 7 wherein the second operations further comprise notifying a user of the availability of an application, or an update to an application, that is not one of the one or more applications.

12. The program product of claim 7 wherein obtaining the installer further comprises obtaining one or more files that include the associated installer.

13. A system comprising:
  a computer readable storage device having instructions stored thereon; and
  one or more computers operable to execute the instructions to perform operations comprising:
    receiving an installer runtime and a first manifest or a first manifest handle identifying the first manifest on a target system, the first manifest referring to one or more first applications available to be installed and referring to one or more first installers, and identifying a first respective server from which each of the one or more first installers can be obtained, each of the one or more first applications being associated with an corresponding first installer of the one or more first installers;
  responsive to the receiving, installing the installer runtime on the target system; and
  executing the installer runtime on the target system to perform first operations comprising:
    for each of the one or more first applications referred to in the first manifest:
      obtaining the corresponding first installer associated with the first application from the first respective server identified for the corresponding first installer by the first manifest, and
      using the corresponding first installer obtained from the first respective server to install the first application on the target system, wherein the first application and the corresponding first installer are not in the first manifest or in the installer runtime;
    receiving a second manifest or a second manifest handle identifying the second manifest, the second manifest referring to one or more second applications available to be installed that is not already installed and referring to one or more second installers, and identifying a second respective server from which each of the one or more second installers can be obtained, each of the one or more second applications being associated with a corresponding second installer of the one or more second installers;
    responsive to the receiving executing the installer runtime on the target system to perform second operations comprising,
      for each of the one or more second applications referred to in the second manifest:
        obtaining the corresponding second installer associated with the second application from the second respective server identified for the corresponding second installer by the second manifest, and
        using the corresponding second installer obtained from the second respective server to install the second application on the target system, wherein the second application and the corresponding second installer are not in the second manifest or in the installer runtime.

14. The system of claim 13 wherein the manifest is signed.

15. The system of claim 14 wherein the second operations further comprise detecting that the manifest is genuine.

16. The system of claim 13 wherein the manifest is an Extended Markup Language (XML) document.

17. The system of claim 13 wherein the second operations further comprise notifying a user of the availability of an application, or an update to an application, that is not one of the one or more applications.

18. The system of claim 13 wherein obtaining the installer further comprises obtaining one or more files that include the associated installer.

* * * * *

UNITED STATES PATENT AND TRADEMARK OFFICE
CERTIFICATE OF CORRECTION

PATENT NO. : 8,261,258 B1
APPLICATION NO. : 11/262056
DATED : September 4, 2012
INVENTOR(S) : Jianu et al.

Page 1 of 1

It is certified that error appears in the above-identified patent and that said Letters Patent is hereby corrected as shown below:

In the Claims:

At Column 13, in claim 13, line 30, delete "an" and insert -- a --

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,261,258 B1 | Page 1 of 1 |
| APPLICATION NO. | : 11/262056 | |
| DATED | : September 4, 2012 | |
| INVENTOR(S) | : Jianu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Twenty-ninth Day of December, 2015

Michelle K. Lee
*Director of the United States Patent and Trademark Office*